United States Patent [19]

Halliday et al.

[11] Patent Number: 4,916,855

[45] Date of Patent: Apr. 17, 1990

[54] REINFORCING A GRASSED SURFACE

[75] Inventors: John Halliday, Edinburgh, Scotland; Keith F. Martin, Wiswell, Great Britain

[73] Assignees: The Royal Hong Kong Jockey Club, Happy Valley, Hong Kong; Netlon Limited, Blackburn, Great Britain

[21] Appl. No.: 175,447

[22] Filed: Mar. 30, 1988

[30] Foreign Application Priority Data

Mar. 30, 1987 [GB] United Kingdom ................. 8707544
Oct. 21, 1987 [GB] United Kingdom ................. 8724616

[51] Int. Cl.$^4$ .......................... E02D 3/00; A01B 79/02

[52] U.S. Cl. .............................................. 47/58; 47/9; 47/56; 405/258

[58] Field of Search .......................... 47/9, 56; 28/160; 428/131, 143, 107, 105, 255, 256, 247, 156, 226, 227, 295, 225; 83/925 CC, 922; 405/258

[56] References Cited

U.S. PATENT DOCUMENTS

| | | | |
|---|---|---|---|
| 2,029,343 | 2/1936 | Sperr | 47/9 |
| 2,605,589 | 8/1952 | Kuestner | 47/56 |
| 3,315,408 | 4/1967 | Fisher | 47/56 |
| 3,687,764 | 8/1972 | Rogosch | 428/107 |
| 3,716,132 | 2/1973 | Lewycykj | 428/105 |
| 3,845,584 | 11/1974 | Mercer | 47/56 |
| 3,863,388 | 2/1975 | Loads | 47/56 |
| 3,980,029 | 9/1976 | Huggett | 111/1 |
| 4,023,506 | 5/1977 | Robey | 47/56 |
| 4,349,594 | 9/1982 | Murakami et al. | 428/136 |
| 4,610,568 | 9/1986 | Koerner | 405/258 |
| 4,790,691 | 12/1988 | Freid | 405/258 |

FOREIGN PATENT DOCUMENTS

| | | | |
|---|---|---|---|
| 2145343 | 3/1972 | Fed. Rep. of Germany . | |
| 2150770 | 4/1973 | Fed. Rep. of Germany | 47/56 |
| 2160576 | 6/1973 | Fed. Rep. of Germany . | |
| 8231033 | 3/1983 | Fed. Rep. of Germany . | |
| 3400696 | 7/1985 | Fed. Rep. of Germany | 47/56 |
| 133927 | 8/1982 | Japan | 405/258 |
| 836555 | 6/1960 | United Kingdom . | |
| 1447742 | 8/1976 | United Kingdom | 405/258 |
| 2120475 | 12/1983 | United Kingdom . | |
| 2136858 | 9/1984 | United Kingdom . | |
| 2184765 | 7/1987 | United Kingdom . | |

OTHER PUBLICATIONS

"Netlon Bravura Turf"—Fourteen (14) page booklet.

"Netlon Mesh Elements—A Case History"—[Sha Tin Racecourse History]—Seven (7) Page Booklet, Apr. 20, 1987.

Andrawes et al., "The Use of Mesh Elements to Alter the Stress-Strain Behaviour of Granular Soils", Third Intl. Conference on Geotextiles, 1986, Vienna, Austria, pp. 839–844.

Leaflet—Green Way.

*Primary Examiner*—Danton D. DeMille
*Attorney, Agent, or Firm*—Fleit, Jacobson, Cohn, Price, Holman & Stern

[57] ABSTRACT

It is highly desirable to reinforce the grassed surface layer of a sports ground in order to reduce damage to the surface, e.g. from horse racing or from playing football. In order to provide a good surface layer, a biaxially-orientated, integrally-extruded plastics material mesh structure layer is laid on a base of sand strengthened with small, flexible, randomly-placed, plastics material mesh pieces. A top dressing is put on top of the mesh structure layer, grass is seeded or planted, and a machine is then used after the grass has grown to slit the mesh structure layer into pieces 1 which may be e.g. 100×100 mm or 150×150 mm, each having a number of complete mesh openings. If a piece is caught by a horse's hoof or by an footballer's stud, it may be ripped out, but the whole mesh layer is not ripped out.

2 Claims, 3 Drawing Sheets

REINFORCING A GRASSED SURFACE

BACKGROUND OF THE INVENTION

The present invention relates to a method of reinforcing a grassed surface layer, primarily for a sports ground such as a horse race track, athletics field or football pitch, although surfaces for any suitable sports can be reinforced using the invention.

A particular problem with sports grounds is that the surface should not be too hard, but good drainage is required and muddy or clayey surfaces are undesirable. Furthermore, public and performers' preference is for a natural grassed surface. From the point of view of drainage, sand performs well, but it is not very coherent, even when grassed, and the surface is easily damaged. One possible solution would be to place a layer of mesh structure just below the surface, but in practice this is highly unsatisfactory. If the mesh structure layer is firmly anchored, players can be badly injured, for example if a boot stud catches in a mesh; if the mesh structure is not firmly anchored, large pieces of mesh structure can be lifted out.

It is already known to use a plastics material mesh structure layer in order to form coherent sods for laying lawns or golf courses—see U.S. Pat. Nos. 2,605,589, 3,863,388, 3,845,584 and 3,980,029, and also the film entitled "World of Netlon" as well as a leaflet entitled "Netlon Bravura Turf" and a booklet entitled "Netlon Bravura Turf". It is also practised with Bermuda Grass (in particular) that the grass, once laid, is slit in one direction in order to cut the transversely growing stems and encourage additional growth. The slits are continuous, and normally about two inches apart. There is also another known procedure in which relatively small elements of open plastic mesh are randomly mixed with soil in order to increase the load-bearing capacity of the soil. Such a procedure is described in GB-A-2 120 475, and is also referred to in the booklet "Netlon Mesh Elements—a Case History", describing the use of the mesh elements at the Sha Tin Race Course in Hong Kong—in the latter disclosure, there is a reference to slitting the grass, as already described above in relation to Bermuda Grass.

None of the above disclosures has solved the problem with which the present invention is concerned.

THE INVENTION

According to the invention, a grassed surface layer is reinforced by providing in the surface layer a flexible mesh structure layer having strands forming mesh openings, which mesh structure is divided into pieces each having a plurality of complete mesh openings, which pieces are either discrete or are so lightly joined that the joins can become broken during normal use of the grass surface; specifically, the mesh structure can be divided into pieces by interrupting at least 50% of those strands around the periphery of each piece which would otherwise connect the piece to the adjacent pieces.

Thus, in accordance with the invention, there is a mesh structure layer immediately below the surface. Normally, the mesh structure layer will be at, above, or just below the uppermost level of the grass roots. The mesh pieces are either completely discrete or are lightly or partly joined together. If the pieces are lightly or partly joined together, the join can be such that the joins will be broken during normal use of the grass surface, e.g. by horses hooves or football players' boots; even if the joins do not become broken in this way, they will become broken if there is a tendency for the mesh structure to be pulled out of the turf, for instance being caught by a horses hoof or by the stud of a football player's boot. The mesh structure layer effectively reinforces the surface layer, but it is unlikely that large sections of the mesh structure layer would be ripped out in use.

The invention is applicable to natural grass surfaces, and any suitable grass can be used. The mesh structure layer can be laid on a base of any type in general terms, including clay, though it is preferred for sports ground to have a sandy or solely sand base. The growing medium of the base can be reinforced with flexible, randomly mixed in, plastics material mesh elements, e.g. as described in GB 2 120 475B. The elements can for instance be as small as 40×40 mm and as large as 100×50 mm. This can improve the retention of the grass and of the pieces of the mesh structure layer by anchoring the roots of the grass to the randomly-mixed elements.

The mesh structure layer can be laid pre-cut. However, this requires a complex machine for the pre-cutting, and it is more difficult to tension the layer when it is on the ground. For this reason, it is preferred to cut at least some of the strands after laying in their final position, and when the root system has been established in the sub-stratum, using a suitable machine.

The grassed surface layer, incorporating the reinforcing material layer, can be produced as described in U.S. 2,605,589, U.S. 3,845,584, U.S. 3,863,388 or U.S. 3,980,029. In general terms, a layer of turf (sod) can be produced by providing a reinforcing material layer and rooting medium and causing grass to grow in the layer so formed (normally by germinating grass seed in the layer); the layer of turf so formed is lifted and transferred to its final position, e.g. on a sports ground. Normally, the turf so produced will be in strips about 750 mm wide and any manageable length, usually a number of meters long. However, in one method, the strips are approximately 300 to 400 mm wide and 750 mm to one meter long. The turf layer can be 20 mm thick or even 12.5 mm thick.

As a further procedure in the turf production described in the previous paragraph, the whole of the soil at the base of the turf can be washed away so as to ensure that there is no incompatibility between the soil in which the turf is grown and the surface on which the turf is to be laid. The washing also ensures faster penetration of the roots into the new sub-base on which the turf has been placed. As a modification, it is not necessary that all the soil should be washed away.

The term "mesh structure" is used generally and includes any laminar reinforcing material which is coherent and through which the roots of the grass can penetrate. Normally the reinforcing material will be porous or perforate and have sufficient open area or holes or meshes for the roots to pass through.

The mesh structure is preferably made of plastics material, but any suitable method of manufacture can be used, including knotting and knitting; it is alternatively possible to use loosely woven materials or non-woven materials such as needled fibres. Nonetheless, the preferred plastics materials have strands which are secured to one another at junctions, and define open meshes. This is most conveniently provided by having integral junctions, for instance made by integral extrusion; if extrusion is used, it is preferred to have the mesh structure biaxially-oriented after extrusion. Suitable integral extrusion methods are disclosed in GB 836 555, GB 969 655 ("Rical"), GB 1 210 354 ("Polylobar"), GB 1 250 478 ("Square Mesh"), GB 1 264 629 ("Rical") and GB 1 406 642 ("Triker"). The pieces are preferably of square, rectangular or parallelogram shape, and may be formed "on the square" or "on the diamond"—if they are formed on the square, the sides of the pieces are parallel and transverse to the machine direction and if they are formed on the diamond, the sides of the pieces are at an angle to the machine direction. The mesh structure itself may be "square" or "diamond"—in square mesh structures, the meshes (which may be rectangular) have their sides running in the machine direction and in the transverse direction, and in diamond structures the sides of the meshes are at an angle to the machine direction.

Any suitable mesh size can be used. Preferred minimum pitches are about 6 mm, about 8 mm, about 10 mm or about 15 mm, in either direction. As the pieces should not be too large, a preferred maximum pitch is about 40 mm. Oversized pieces could cause injury to horses if a shoe caught in the mesh structure, or injury to players if say a boot stud caught in the mesh structure. In general terms, it is believed that the pieces should be significantly smaller than the size of commercial turves or sods (normally never less than 500×300 mm), and a preferred maximum size of 200×300 mm is indicated for e.g. sports pitches though for horse race tracks 300×200 mm is a preferred maximum size. A preferred minimum size is 70×70 mm. Within this range, larger pieces would be suitable for race tracks and smaller pieces would be suitable for football pitches or athletics fields. More preferred sizes are about 100×100 mm or about 150×150 mm. In practice, as the mesh structure will not be cut strictly parallel to the strands, there will be a variation in the number of complete mesh openings per piece. Regarding the average number of complete mesh openings per piece, a preferred minimum is about 9 or about 16 and a preferred maximum is about 225 or even as high as 900, a narrower preferred range being about 40 to about 100.

If the mesh structure is divided before laying, it is preferred that the pieces should be held together e.g. at the corners. In general, during division, it is preferred that up to about 80% or up to about 90% of the strands around the periphery of each piece should be interrupted—a preferred minimum is about 60% or about 70%. The percentage interruptions can be considered for each piece, or alternatively as the average for all the pieces.

One way of dividing the mesh structure into pieces is to lay the mesh structure in parallel, and preferably overlapping, strips and subsequently to divide the strips by cutting them transversely. Particularly if the strips overlap, it is preferred to seed or plant the grass when the mesh structure is in situ (but before dividing). As a further possibility, the strips may be part-cut transversely, before laying, no cutting then being required after laying.

BRIEF DESCRIPTION OF THE DRAWINGS

The invention will be further described, by way of example, with reference to the accompanying drawings, in which.

PREFERRED EMBODIMENTS OF THE INVENTION

Figure 1:
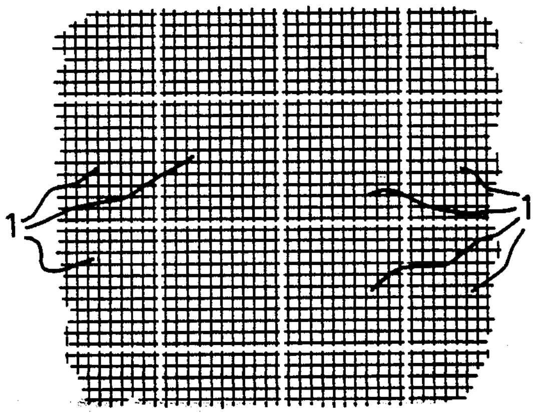
FIG. 1 is a schematic plan showing the mesh structure in a sports ground surface in accordance with the invention.
Figure 2:
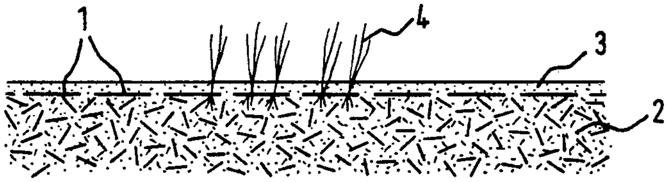
FIG. 2 is a vertical section through the surface of FIG. 1.

In FIG. 1, the pieces 1 are formed by dividing a long strip or web of flexible mesh structure, and each piece has strands forming a number of complete mesh openings, these strands being interrupted all around the periphery of each piece 1. FIG. 2 shows the pieces 1 resting on a soil base 2 which has been strengthened in accordance with GB 2 120 475B, and covered by a top dressing 3. Grass 4 is shown schematically with the pieces 1 in the zone of the grass roots.

Figure 3:
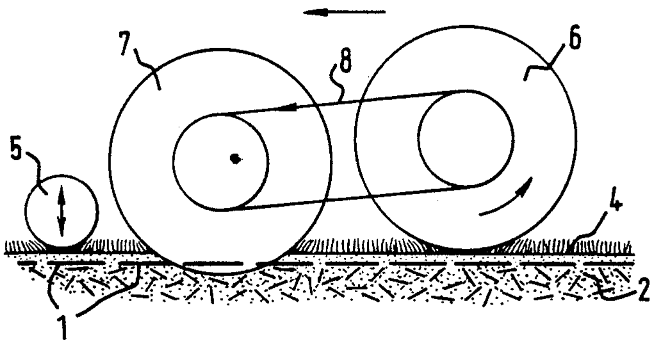
FIG. 3 is a schematic elevation of a machine for cutting up the mesh structure after laying.

FIG. 3 shows a machine for cutting the mesh strip once the grass had grown, say 6 or 8 weeks after seeding the grass or placing the grass stolons. The machine is run over the grass first in one direction and then in the direction at right angles, generally parallel to the sets of strands in the mesh structure. The machine is carried by an adjustable-height front roller 5 and a rear cylinder 6 driven e.g. by a petrol engine (not shown). A bank of circular, spaced slitting blades 7 is connected e.g. by a belt 8 to the drive for the cylinder 6. "Self-sharpening" stones may be mounted by each blade 7. The front roller 5 is adjusted to ensure that the blades 7 are sufficiently deep to slit the mesh structure, and the spacing of the blades 7 is adjustable along a carrying shaft in order to predetermine the size of the mesh pieces. The machine travels in the direction of the horizontal arrow.

Figure 4:
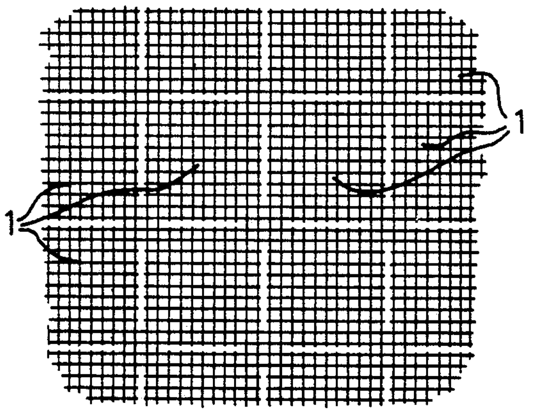
FIG. 4 corresponds to FIG. 1, but shows an alternative mesh structure.

FIG. 4 just shows a strip of mesh structure which has been discontinuously cut, the pieces 1 being delineated or represented by being connected together by two or more strands at each of their corners.

Figure 5:
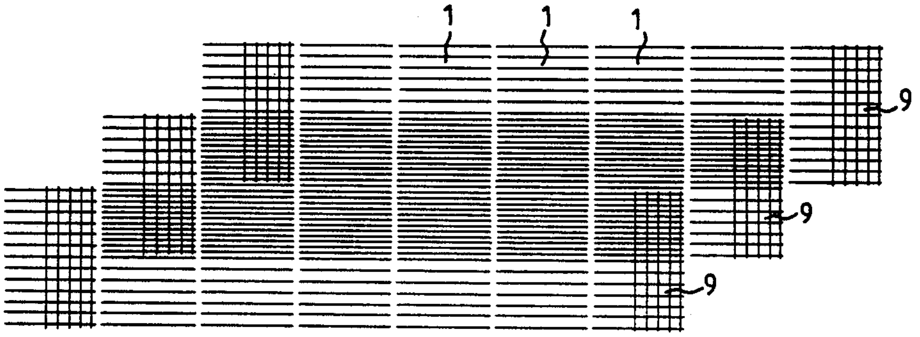
FIG. 5 is a schematic plan showing an alternative way of laying and cutting the mesh structure.

FIG. 5 shows the mesh structure can be laid in parallel, overlapping strips 9. Preferably each strip 9 overlaps the preceding strip width-wise by about 50%, so that roughly there will be two layers—this avoids gaps being formed accidentally. Most conveniently, the strips 9 extend right across the minimum dimension of the surface being reinforced, e.g. transversely of a racecourse or football pitch. For a horse racecourse, the strips 9 can be 300 mm wide. The strips 9 are then cut across, in only one direction, at suitable intervals. For a horse racecourse, these can be 150 mm, giving 300×150 mm pieces 1.

EXAMPLES

To form a base, a 200 mm thick layer of pure sand (graded as in the graph of FIG. 6) was mixed with 100×50 mm mesh elements of mesh structure 1 of Table 1 of GB 2 120 475B. The proportion of mesh elements to sand can be varied from 3 Kg/m$^3$ to 6 Kg/m$^3$ but should be uniform throughout. A long roll of 2 or 3 meter wide, biplanar, biaxially-oriented mesh structure manufactured in accordance with GB 836 555 was rolled out over the base, stretched both longitudinally and transversely, and pegged down to form a mesh structure layer. The surface was then seeded with grass seed, or alternatively grass stolons can be planted individually through the mesh openings. The seeds (or stolons) were then top dressed with sand. The top dressing can be of any thickness in the range 10 to 30 mm. As the grass grew, roots developed and could be wholly below the mesh structure layer, or pass down through the mesh structure layer. After the grass had grown, the entire surface was cut as described above with reference to FIG. 3.

EXAMPLES 1 and 2

Figure 6:
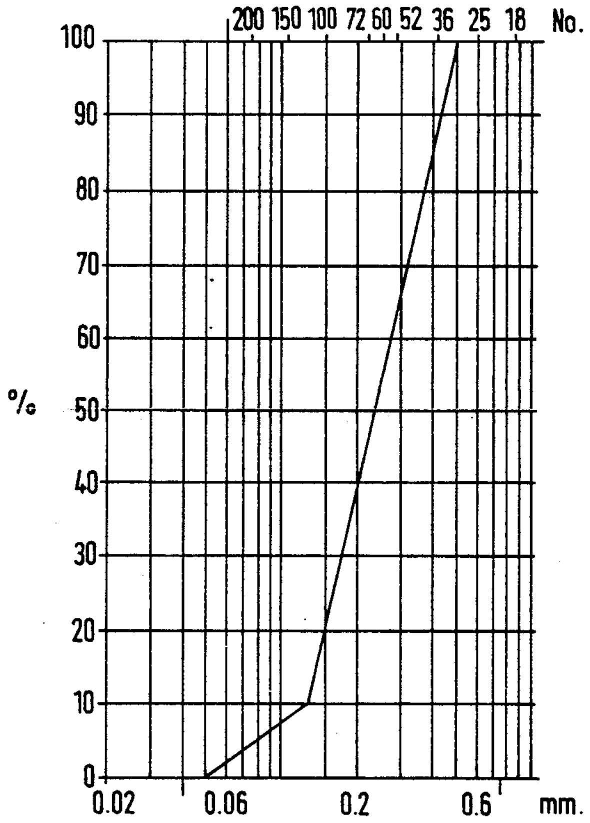
FIG. 6 is a sand graph (summation percentage against particle size (mm) along the bottom, British Standard sieve number being indicated along the top).

For cut pieces of respectively 100×100 mm and 150×150 mm, the mesh structure can be extruded in accordance with FIG. 6 of GB 1 210 354 and in accordance with GB 1 250 478 so that the specially-shaped strands run in the machine and transverse directions. The final mesh structure is provided in 2 m wide rolls. The mesh structure is as follows:

| | Example 1 100 × 100 mm | Example 2 150 × 150 mm |
|---|---|---|
| Unit Weight, $g/m^2$ | 50 | 60 |
| Mesh pitch, mm | 10 × 10 | 20 × 20 |
| Stretch ratio in each direction | 4.5:1 | 4.5:1 |
| Strand thickness (mid-point), mm | 0.35 | 0.4 |
| Complete mesh openings per piece (average) | 44 | 60 |

The 100×100 mm pieces of Example 1 are suitable for a football field and the 150×150 mm pieces of Example 2 for a horse racecourse.

The mesh structure of Example 2 could alternatively be cut into 300 mm wide strips and used as shown in FIG. 5.

EXAMPLE 3

Alternatively a 2 m wide roll of the mesh structure can have been part slit in the machine and transverse directions to cut an average of 75% of the strands around each piece, and used as above without the subsequent cutting. The mesh structure can be as in Example 1 or 2.

The present invention has been described above purely by way of example, and modifications can be made within the spirit of the invention. For instance, if substitute natural materials for grass (such as other soil-binding plants) exist or are developed, these are also within the invention.

I claim:

1. A method of reinforcing a grassed surface layer, comprising providing in the surface layer a flexible mesh structure layer having strands forming mesh openings by laying a web of mesh structure comprising a plurality of pieces, each said piece having a plurality of complete mesh openings and at least 50% but not all of those strands around the periphery of each piece which would otherwise connect the piece to the adjacent pieces, being interrupted, sufficient uninterrupted strands being left at the peripheries of the pieces to provide a coherent mesh structure for laying.

2. A method of reinforcing a grassed surface layer of a sports ground, comprising:

providing a base of growing medium strengthened by random mixing with flexible plastics material mesh elements;

laying on said base parallel, substantially flat strips of a flexible mesh structure web comprising strands which are integral with one another at junctions and define open meshes;

providing above said web a top dressing of substantially uniform thickness;

permitting grass to grow, whereby said web will be adjacent the level of the roots of said grass; and subsequently and as soon as the grass is established but before the grass is used for any substantial sport thereon, cutting said strips transversely so as to divide said web into a multiplicity of discrete pieces each of which is of right-angled quadrilateral shape and has a size greater than about 70×70 mm and not greater than about 300×200 mm, and has a plurality of complete meshes, using a cutter which penetrates said top dressing.

* * * * *